United States Patent
Chun et al.

(10) Patent No.: US 10,160,010 B2
(45) Date of Patent: Dec. 25, 2018

(54) HAPTIC ACTUATOR

(71) Applicant: G2HYSONIC CO., LTD., Ansan-si, Gyeonggi-do (KR)

(72) Inventors: Se Jun Chun, Ansan-si (KR); Jong Sik Seo, Ansan-si (KR)

(73) Assignee: G2HYSONIC CO., LTD., Ansan-Shi, Gyeonggi-Do (KR)

( * ) Notice: Subject to any disclaimer, the term of this patent is extended or adjusted under 35 U.S.C. 154(b) by 150 days.

(21) Appl. No.: 15/208,411

(22) Filed: Jul. 12, 2016

(65) Prior Publication Data

US 2017/0056927 A1 Mar. 2, 2017

(30) Foreign Application Priority Data

Sep. 1, 2015 (KR) .......................... 10-2015-0123676

(51) Int. Cl.
   *H02K 33/16* (2006.01)
   *B06B 1/04* (2006.01)

(52) U.S. Cl.
   CPC ............. *B06B 1/045* (2013.01); *H02K 33/16* (2013.01)

(58) Field of Classification Search
   CPC .......... H02K 33/16; H02K 1/34; H02K 35/02; B06B 1/04; B06B 1/45
   USPC .......... 310/15, 17, 21, 29, 36, 38, 25, 12.16; 381/396, 412, 420, 421
   See application file for complete search history.

(56) References Cited

U.S. PATENT DOCUMENTS

| 2009/0267423 | A1* | 10/2009 | Kajiwara | H02K 33/02 310/36 |
| 2012/0187780 | A1* | 7/2012 | Bang | H02K 33/16 310/25 |
| 2016/0181900 | A1* | 6/2016 | Xu | H02K 33/16 310/12.27 |
| 2016/0181902 | A1* | 6/2016 | Xu | H02K 33/16 310/17 |

(Continued)

FOREIGN PATENT DOCUMENTS

KR 10-2011-0037335 A 4/2011

*Primary Examiner* — Thomas Truong
*Assistant Examiner* — Eric Johnson
(74) *Attorney, Agent, or Firm* — Novick, Kim & Lee, PLLC; Jae Youn Kim (57) ABSTRACT

The present invention relates to a haptic actuator that generates vibration, and more particularly, to a vibration actuator that can reduce falling time of vibration after applied power is blocked while maintaining a vibration force. A haptic actuator of the present invention is an actuator that vibrates using an electromagnetic force generated by a magnet and a coil, and the haptic actuator includes a case that has a space in the inside thereof; a fixing member that is fixed to the case; a vibrating body that vibrates in the right and left directions about the fixing member; an elastic member that is bent several times and elastically supports the vibrating body so that the vibrating body maintains at the initial position; and an insertion member that is inserted into a wrinkle space formed by the bending of the elastic member, and the insertion members act against the elastic force of the elastic member and thus falling time of the vibrating body is decreased, when the vibrating body is vibrated in the right and left directions by the elastic force of the elastic member after the electromagnetic force is removed.

4 Claims, 7 Drawing Sheets

(56) References Cited

U.S. PATENT DOCUMENTS

2016/0181904 A1\* 6/2016 Zhang .................... H02K 33/12
 310/17
2017/0033672 A1\* 2/2017 Xu ......................... H02K 33/16

\* cited by examiner

HAPTIC ACTUATOR

TECHNICAL FIELD

The present invention relates to a haptic actuator that generates vibration, and more particularly, to a vibration actuator that can reduce falling time of vibration after applied power is cut off while maintaining vibration force.

BACKGROUND ART

Generally bell sound and vibration are well used for the receipt of communication device. For the vibration, it is a general case that a whole device is able to vibrate by actuating a small vibration generation device and subsequently transferring an actuating force to a case of the device.

Currently, the vibration generation device which is one of the receipt means applied in the communication device such as a cell phone is a component converting electric energy into mechanical vibration by using the generating principle of electromagnetic force and the vibration generation device is installed in a cell phone and is used for silent notice of the receipt.

The vibration generation device is installed in a game device or the like in order to inform user thereof of the game progress conditions or the vibration generation device is installed in a touch phone or the like in order for user thereof to know feeling that keys thereof were touched.

Figure 1:
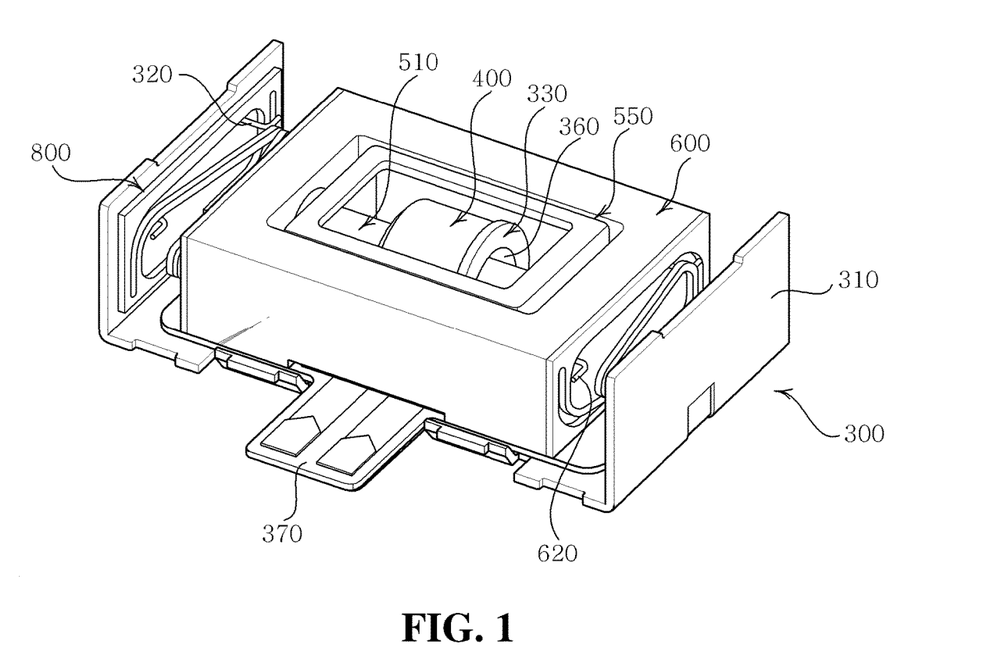
FIG. 1 is a perspective view illustrating a horizontal linear vibrator of the related art.

Korea Patent Publication No. 10-2011-0037335 discloses a horizontal linear vibrator of the related art for generating a vibration. FIG. 1 is a perspective view illustrating a horizontal linear vibrator of the related art.

The linear vibrator of the related art includes a bracket 300 into which a case 200 is fitted and which defines an inter space between the bracket 300 and the case 200; a stator that is installed on the bracket 300, and includes an inside hollow coil 400 in which has a horizontal shaft; a vibrator 700 having a magnet portion 510 that passes through the inside of the coil and in which magnets is formed on the both sides of a magnetic core with magnet polarities facing each other, a yoke 550 that includes the coil, surrounds the outside of the magnet portion 510 and fixes the both terminal ends of the magnet portion 510, and a weight body 600 that provided on the outside of the yoke, is integrally fixed with the yoke and move together the yoke; and a leaf spring 800 that has both ends of which one end is connected to the outer side of the case 200 and to the inner side of the bracket 300 respectively. The linear vibrator of the related art vibrates in the horizontal direction thereby increasing the vibration quantity.

However, even if the applied power is cut off to the coil in the linear vibrator of the related art, the vibrator is vibrated by the elasticity of the leaf spring portion and a predetermined times is taken until the vibrator is stopped at the initial position. In other words, the falling time of vibration occurs. Accordingly, it is difficult to control the vibration as the falling time is longer and thus the delicate vibration cannot be performed. As an example, in a case where the two vibrations is generated at short intervals, when the falling time of the vibration is longer, since a second vibration is generated before a first vibration is completely terminated, it is difficult to distinguish the two vibrations from each other. At this time, the vibration generation interval between the two vibrations must be increased in order to distinguish the two vibrations from each other. Accordingly, it is impossible to precisely control and to delicately perform the vibration.

DISCLOSURE

Technical Problem

The present invention has been made in an effort to solve the above-described problems, and it is an object of the present invention to provide a haptic actuator that can reduce falling time of vibration after applied power is cut off while maintaining a vibration force and is capable of improving vibration performance.

Technical Solution

In order to achieve the object, a haptic actuator vibrating using an electromagnetic force generated by a magnet and a coil, and the haptic actuator includes a case that has a space in the inside thereof; a fixing member that is fixed to the case; a vibrating body that vibrates in the right and left directions about the fixing member; an elastic member that is bent several times and elastically supports the vibrating body so that the vibrating body maintains at the initial position; and an insertion member that is inserted into a wrinkle space formed by the bending of the elastic member, wherein the insertion members act against the elastic force of the elastic member and thus falling time of the vibrating body is decreased, when the vibrating body is vibrated in the right and left directions by the elastic force of the elastic member after the electromagnetic force is removed.

The insertion members are formed of a rubber material or a sponge material. The thickness of the insertion is thicker than the width of the wrinkle space when the elastic member is expanded up to the maximum in the receiving space.

The elastic member has a plurality of wrinkle spaces. The insertion member is disposed in per an even-numbered wrinkle space of the wrinkle spaces.

The fixing member includes a coil wounded around a shaft member. The vibrating body includes a plurality of magnets that generate a magnetic field around the coil; a plurality of magnetic bodies that connects the plurality of magnets with each other; a weight body that mounted on the plurality of magnetic bodies; a holder that integrally couples the magnet, the plurality of magnetic bodies, and the weight body and is connected the elastic member to the right and left sides of the holder. The holder has an upper portion plate, a plurality of side surface plates that is downwardly bent from the upper portion plate so as to surround the magnet, and a plurality of press plates that are downwardly bent from the right and left sides of the upper portion plate, has a coupling groove in which an end of the elastic member is inserted, and press the end of the elastic member inserted into the coupling groove in an inside direction of the holder to fix the end of the elastic member. An inclined portion that inclines in the outer direction of the holder is provided in the lower end of the side surface plate. A projection portion that is bent to have a curved surface shape in order to be projected in the inside direction of the holder, and is in contact with the weight body is formed.

An engaging portion by which restricts insertion depth of the elastic member inserted in the coupling groove is projected from the right and left sides of any one side surface plate of the side surface plates.

Advantageous Effects

A vibrating actuator according to the present invention has an elastic member that elastically supports the vibrating body vibrating in a right and left directions and in which a wrinkle space is formed, and an insertion member is inserted in the wrinkle space, thereby minimizing the decrease of vibration power of the vibrating portion that vibrates by electromagnetic force and thus the falling time of the vibrating body that vibrates in the right and left directions by the elastic force of the elastic member can be reduced after the power applied to a coil is removed while maintaining the high vibration force. Accordingly, the time taken until the vibrating body is stopped is minimized and thus it is possible to precisely control and to delicately perform the vibration.

DESCRIPTION OF DRAWINGS

The above and other objects, features and advantages of the present invention will become apparent from the following description of preferred embodiments given in conjunction with the accompanying drawings, in which.

BEST MODE

A vibrating actuator according to the present invention relates to a haptic actuator that generates vibration, and can minimize the decrease of vibration power of the vibrating portion that vibrates by electromagnetic force and thus the falling time of the vibrating body that vibrates in the right and left directions by the elastic force of the elastic member is reduced after the power applied to a coil is cut off while maintaining the high vibration force. Accordingly, the time taken until the vibrating body is stopped is minimized and thus it is possible to precisely control and to delicately perform the vibration.

Hereinafter, the present invention will be described with reference to the drawings attached.

Figure 2A:
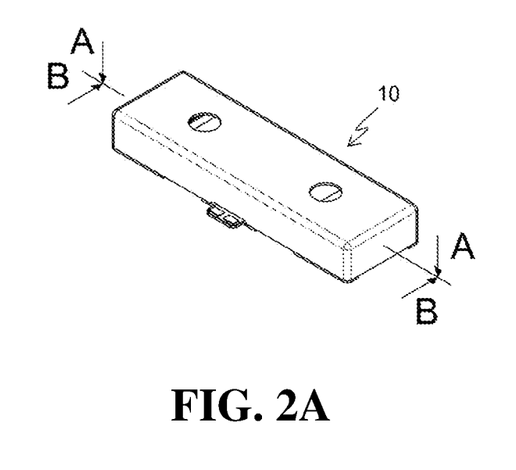
FIG. 2 is a perspective view illustrating a haptic actuator according to an embodiment of the present invention.
Figure 2B:
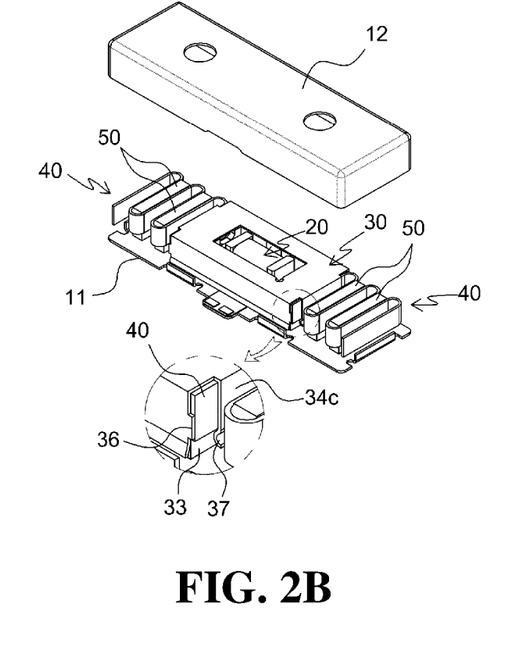
Figure 4A:
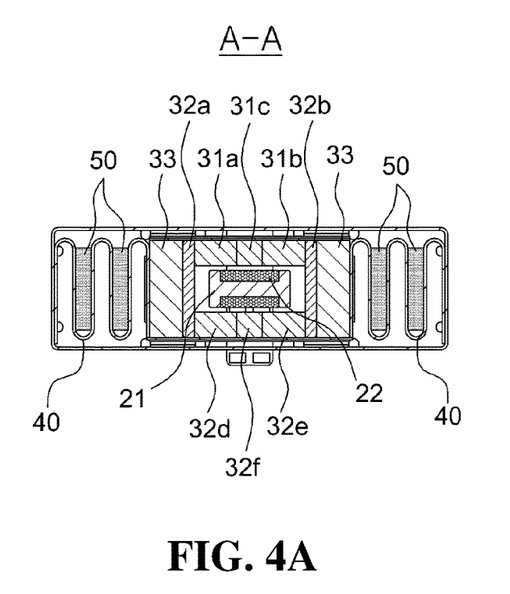
FIG. 4 is a cross-sectional view illustrating a haptic actuator according to an embodiment of the present invention.
Figure 4B:
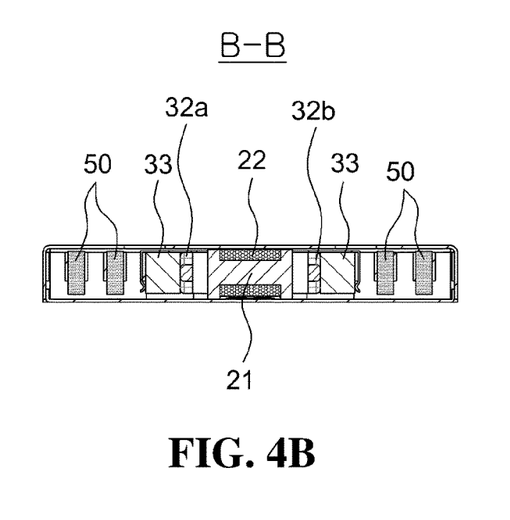
Figure 6:
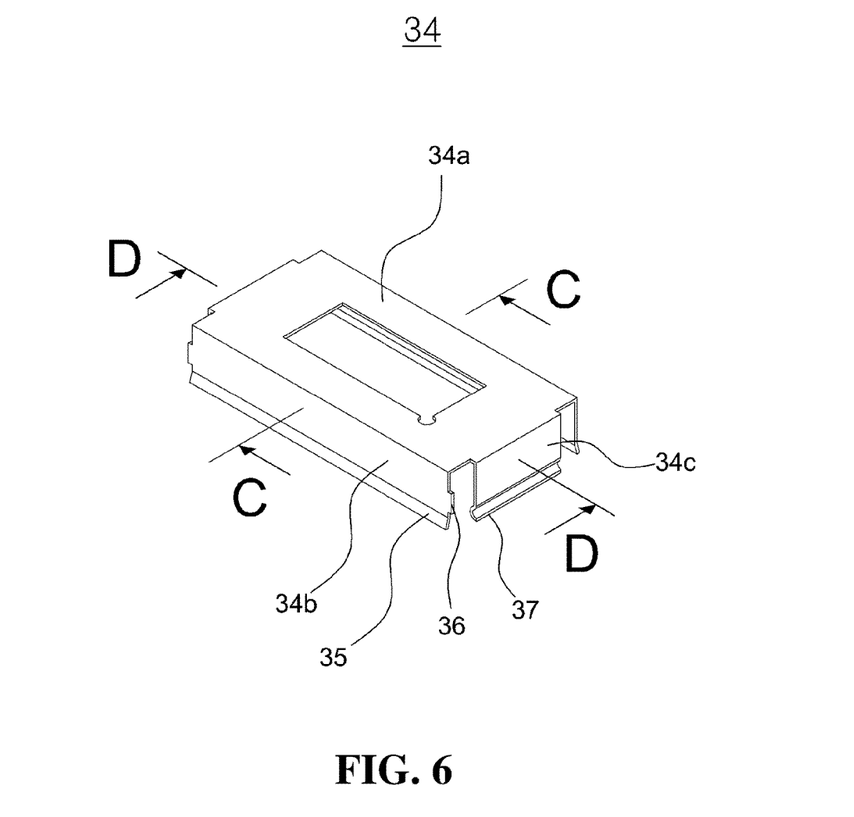
FIG. 6 is a perspective view separately illustrating a holder according to an embodiment of the invention.
Figure 7A:
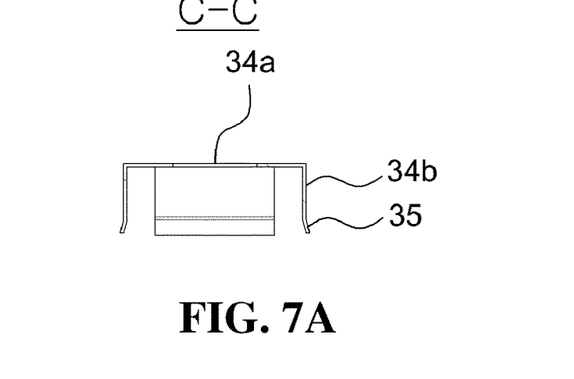
FIGS. 7A-7B are cross-sectional views illustrating a holder according to an embodiment of the present invention.
Figure 7B:
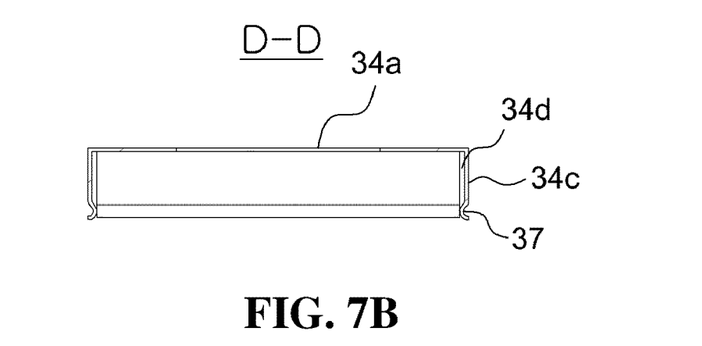

FIG. 2A is a perspective view illustrating a haptic actuator and FIG. 2B is a perspective view illustrating the inside structure of the case with a base and cover separated from the case. FIG. 4A is a cross-sectional view taken line A-A of FIG. 2A and FIG. 4B is a cross-sectional view taken line B-B of FIG. 2B. FIG. 7A is a cross-sectional view taken line C-C of FIG. 6 and FIG. 7B is a cross-sectional view taken line D-D of FIG. 6.

The haptic actuator according to the embodiment of the present invention includes a case 10, a fixing member 20, a vibrating body 30, an elastic member 40 and an insertion member 50, as illustrated in FIGS. 2 to 7B.

The case 10 has, in the inside thereof, a receiving space in which the fixing member 20, the vibrating body 30, the elastic member 40 and the insertion member 50 is disposed. The case 10 is mounted on an electronic equipment such as a mobile terminal. This case 10 includes a base 11 and the cover 12 coupled to the upper portion of the base 11, as illustrated in FIG. 2.

Figure 3:
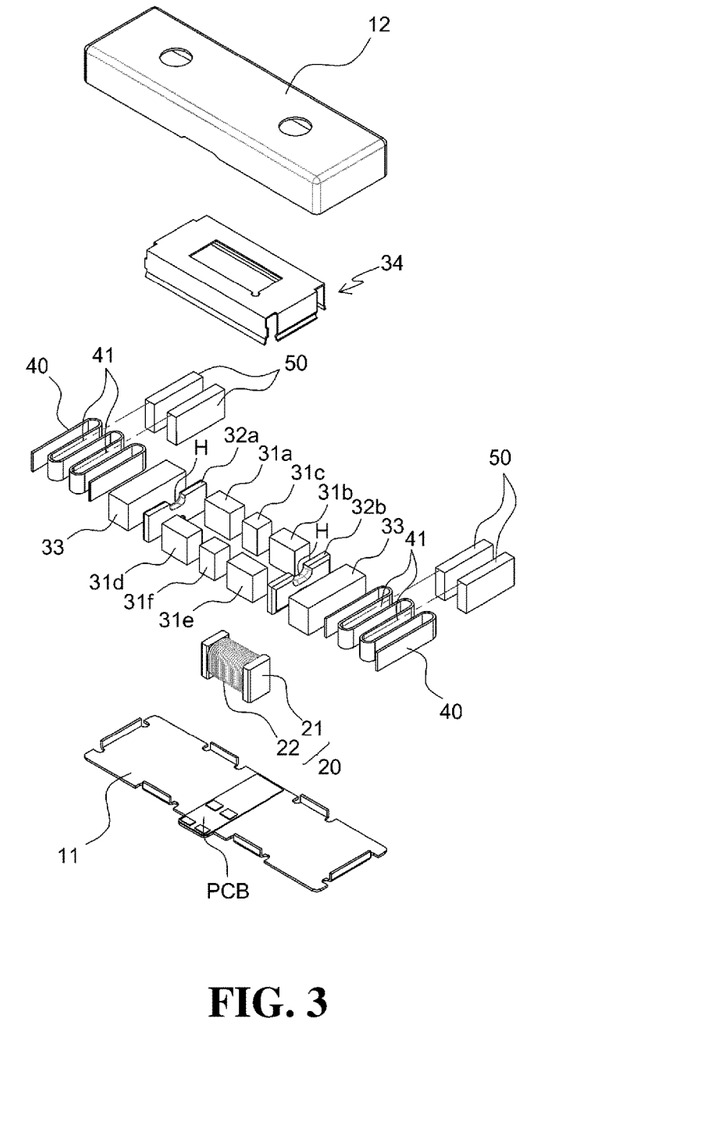
FIG. 3 is an exploded perspective view illustrating a haptic actuator according to an embodiment of the present invention.

The fixing member 20 is fixed to the inside of the case 10 to be disposed in the receiving space. Specifically, as illustrated in FIG. 3, the fixing member 20 includes a shaft member 21 fixed to the upper portion of the base 11 and a coil 22 wound around the shaft member 21. The coil 22 is electrically connected to a circuit board (PCB) and thus current is generated in the coil when power is applied in the coil.

The vibrating body 30 vibrates in the right and left directions about the fixing member 20 in the receiving space. This vibrating body 30 includes a plurality of magnets, a magnetic body, a weight body 33 and a holder 34.

The magnet is divided into a first magnet to a third magnet (31a, 31b, and 31c) and a fourth magnet to a sixth magnet (31d, 31e, and 31f) as illustrated in FIG. 4A.

Figure 5:
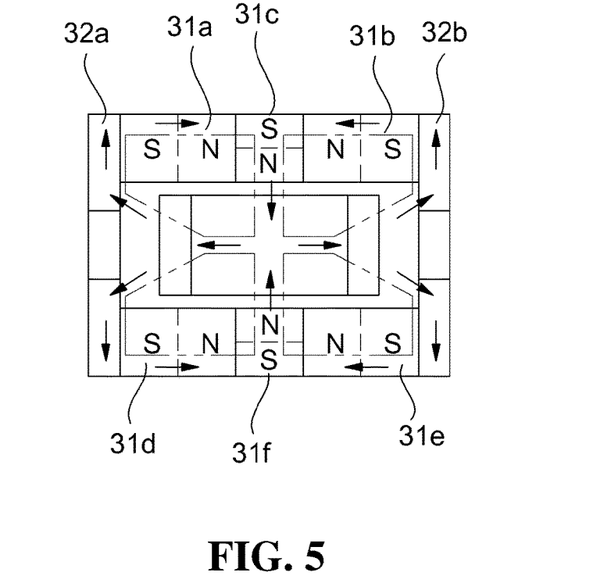
FIG. 5 is a view illustrating a structure of a magnetic force according to an embodiment of the present invention.

As illustrated in FIG. 5, the first magnet 31a and the second magnet 31b are polarized into the left and right. The N poles of the first magnet 31a and the second weight 31b are formed in a direction facing the first magnet 31a and the second magnet 31b. The third magnet 31c is positioned between the first magnet 31a and the second magnet 31b. The N pole of this third magnet 31c is formed in the direction in which the coil 22 is positioned and the S pole thereof is formed in the direction opposite to direction in which the coil 22 is positioned.

The fourth magnet 31d and the fifth magnet 31e are polarized into the left and right as the first magnet 31a and the second magnet 31b. The N poles of the fourth magnet 31a and the fifth magnet 31e are formed in a direction facing the fourth magnet 31d and the fifth magnet 31e. Further, the sixth magnet 31f is positioned between the fourth magnet 31d and the fifth magnet 31e. The N pole of this sixth magnet 31f is formed in the direction in which the coil 22 is positioned and the S pole thereof is formed in the direction opposite to direction in which the coil 22 is positioned.

The first to the third magnets (31a, 31b, and 31c) and the fourth to the sixth magnets (31d, 31e, and 31f) as described above are spaced apart from each other about the coil 22 and a magnetic field is generated around the coil 22 as illustrated in FIG. 4A.

The magnetic body includes a first magnetic body 32a and a second magnetic body 32b. Specifically, the first magnetic body 32a connects the first magnet 31a and the third magnet 31c and the second magnetic body 32b connects the second magnet 31b and the fifth magnet 31e. According to this, the coil 22 is positioned in the inter space between the first to the sixth magnets 31a to 31f and the first magnetic body 32a and the second magnetic body 32b. A semi-circular shape of magnetic force enhancing groove(H) is formed in the first magnetic body 32a and the second magnetic body 32b as illustrated in FIG. 3. The magnetic force enhancing groove (H) can improve the driving force of the vibrating body 30 by enhancing the strength of the magnetic force when the first magnetic body 32a and the second magnetic body 32b are magnetized. The weight bodies 33 are mounted on the first magnetic body 32a and the second magnetic body 32b respectively.

The holder 34 integrally couples the magnet, the magnetic body, and the weight body 33 and the elastic member 40 is connected on the right and left sides of the holder respectively. This holder 34 includes an upper portion plate 34a, a side surface plate 34b and a press plate 34c as illustrated in FIG. 6.

The upper portion plate 34a cover the upper portion of the magnet, the magnetic body and the weight body and the plurality of side surface plates 34b facing each other surrounds the magnet by downwardly bending from the upper portion plate 34a. The pair of press plates 34c facing each other is downwardly bent from the right and left sides of the upper portion plate 34a and a coupling groove 34d in which one end of the elastic member 40 is inserted is formed. The one end of the elastic member 40 inserted into the coupling groove 34d is pressed in the inside direction of the holder 34 to be fixed.

More specifically, an inclined portion 35 inclined in the outer direction of the holder 34 is formed in the lower end of the side surface plate 34b as illustrated in FIG. 7A. Accordingly, the holder 34, the magnet, the magnetic body and the weight body 33 is easily coupled by including the inclined portion 35 inclined in the outside direction of the holder 34 in the lower end of the side surface plate 34b. Further, as illustrated in FIG. 6, an engaging portion 36 that restricts the insertion depth of the elastic member 40 inserted into the coupling groove 34d is projected into right and left sides of any one side surface plate 34b of the pair of the side surface plate 34b. According to this, one end of the elastic member 40 is inserted into the coupling groove 34d by a predetermined depth (see FIG. 2B). As illustrated in FIG. 7B, a projecting portion 37 that is in contact with the weight body 33 by bending into a circular shape to be projected in the inside direction of the holder 34 in the lower end of the press plate 34c is formed. According to this, it is easy for the elastic member 40 to insert into the coupling groove 34d or to separate from the coupling groove 34d.

The elastic member 40 elastically supports the vibrating body 30 so that the vibrating body 30 maintains the initial position thereof. The elastic member 40 bends several times to form a plurality of wrinkle spaces 41. As described below, one end of the elastic member 40 is inserted into the coupling groove 34d to be coupled to the holder 34. The other end of the elastic member 40 is connected to the case 10. This elastic member 40 consists of two portions and thus elastically supports the vibrating body 30 at the right and left sides of the vibrating body 30.

The insertion member 50 is formed of a rubber material or a sponge material and is inserted into the wrinkle space 41 formed in the elastic member 40. The thickness of the insertion member 50 is thicker than the width of the wrinkle space 41 when the elastic member 40 expands up to maximum in the receiving space. According to this, the insertion member 50 inserted into the wrinkle space 41 is maintained at a state inserted into the wrinkle space 41 by being pressed with the elastic member 40 without a separate fixing means. In the present embodiment, the insertion member 50 is inserted in per an even-numbered wrinkle space 41 of the wrinkle spaces 41. According to this, the wrinkle space 41 that is formed in the right and left of the wrinkle space 41 in which the insertion member 50 is inserted remains to be an empty space.

This insertion member 50 is compressed and expanded by the elastic member 40 when the vibrating body 30 is vibrated in a right and left direction by electromagnetic force. The insertion member 50 causes the vibrating body 30 to stop by reducing the falling time of the vibrating body 30 against the elastic force of the elastic member 40, when the vibrating body 30 vibrates in the right and left direction by the elastic force of the elastic member 40 after the electromagnetic force is removed. In other words, the time taken the vibrating body 30 vibrating is stopped at the initial position is reduced by inserting the insertion member 50 into the wrinkle space formed in the elastic member 40. Accordingly, the time taken until the vibrating body 30 is stopped is minimized and thus it is possible to precisely control and to delicately perform the vibration.

Meanwhile, since resistance of the insertion member 50 generating against the elastic force of the elastic member 40 at the time of compression of the elastic member 40 when the vibrating body 30 vibrates by electromagnetic force is very small compared to the electromagnetic force to vibrate the vibrating body 30, loss of vibration power by the insertion member 50 is negligible.

INDUSTRIAL APPLICABILITY

While the haptic actuator according to the present invention has been described with respect to the specific embodiments, it will be apparent to those skilled in the art that various changes and modifications may be made without departing from the spirit and scope of the invention as defined in the following claims.

The invention claimed is:

1. A haptic actuator using an electromagnetic force generated by a magnet and a coil, the haptic actuator comprising:
    a case that has a space in an inside thereof;
    a fixing member that is fixed to the case;
    a vibrating body that vibrates in a right and a left directions about the fixing member;
    an elastic member that is bent one or more times and elastically supports the vibrating body so that the vibrating body maintains an initial position; and
    an insertion member that is inserted into a wrinkle space formed by the bent elastic member,
    wherein the insertion member acts against an elastic force of the elastic member and thus a falling time of the vibrating body is decreased, when the vibrating body is vibrated in the right and left directions by the elastic force of the elastic member after the electromagnetic force is removed,
    wherein the fixing member includes a coil wound around a shaft member,
    wherein the vibrating body includes:
    a plurality of magnets that generate a magnetic field around the coil;
    a plurality of magnetic bodies that connect the plurality of magnets with each other;
    weight bodies mounted on the plurality of magnetic bodies;
    a holder that integrally couples the plurality of magnets, the plurality of magnetic bodies, and the weight bodies, wherein the elastic member is connected to a right or a left side, with respect to the right and left directions, of the holder,
    wherein the holder has an upper portion plate, a plurality of side surface plates that are downwardly bent from the upper portion plate so as to surround the plurality of magnets, a plurality of press plates that are downwardly bent from a right and a left sides, with respect to the right and left directions, of the upper portion plate, and a coupling groove in which an end of the elastic member is inserted, the coupling groove configured to press the end of the elastic member inserted into the coupling groove in an inside direction of the holder to fix the end of the elastic member,
    wherein an inclined portion that inclines in an outer direction of the holder is disposed in a lower end of one of the plurality of side surface plates, and wherein a projection portion that is bent to have a curved surface shape in order to be projected in the inside direction of the holder, and is in contact with the weight body, is formed.

2. The haptic actuator according to claim 1,
wherein the insertion member is formed of a rubber material or a sponge material,
wherein a thickness of the insertion member is thicker than a width of the wrinkle space when the elastic member is expanded up to a maximum position in the receiving space.

3. The haptic actuator according to claim 1,
wherein the elastic member has a plurality of wrinkle spaces, and
wherein the insertion member is disposed in an even-numbered wrinkle space of the wrinkle spaces.

4. The haptic actuator according to claim 1, wherein an engaging portion configured to restrict an insertion depth of the elastic member inserted in the coupling groove is projected from a right and a left sides, with respect to the right and left directions, of any one side surface plate of the plurality of side surface plates.

\* \* \* \* \*